(No Model.)

G. F. CASE.
BICYCLE.

No. 503,828. Patented Aug. 22, 1893.

WITNESSES:
C. Neveux
E. Sedgwick

INVENTOR
G. F. Case
BY Munn & Co.
ATTORNEYS.

UNITED STATES PATENT OFFICE.

GEORGE F. CASE, OF MEDINA, NEW YORK.

BICYCLE.

SPECIFICATION forming part of Letters Patent No. 503,828, dated August 22, 1893.

Application filed January 28, 1893. Serial No. 460,058. (No model.)

*To all whom it may concern:*

Be it known that I, GEORGE F. CASE, of Medina, in the county of Orleans and State of New York, have invented a new and useful Improvement in Bicycles, of which the following is a full, clear, and exact description.

My invention relates to an improvement in bicycles, tricycles and like machines, and the object of the invention is to provide a spring cushioned connection between the frame of the machine and the driving wheel whereby the rider will not be uncomfortably affected by the wheel passing over irregular surfaces, and furthermore whereby the driving wheel will be held at all times in proper alignment with the frame with which it is connected.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
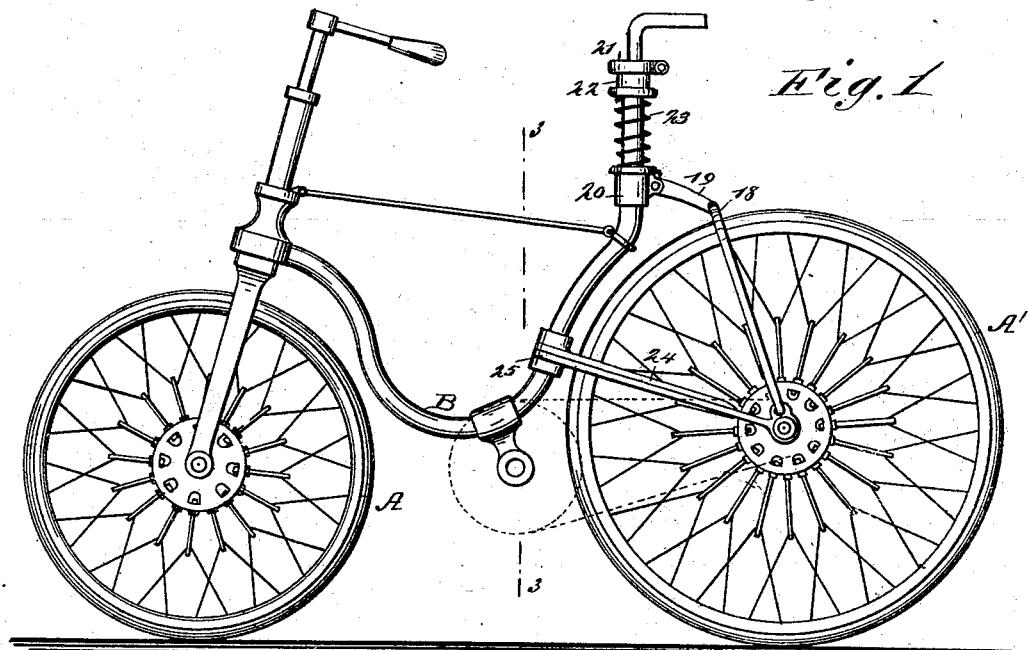
Figure 2:
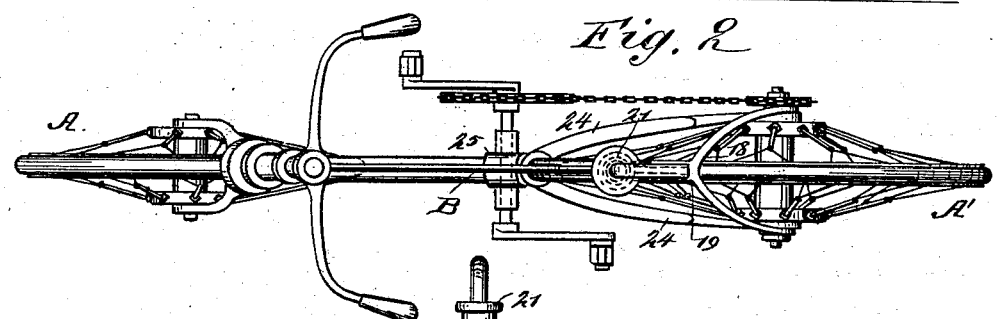
Figure 3:
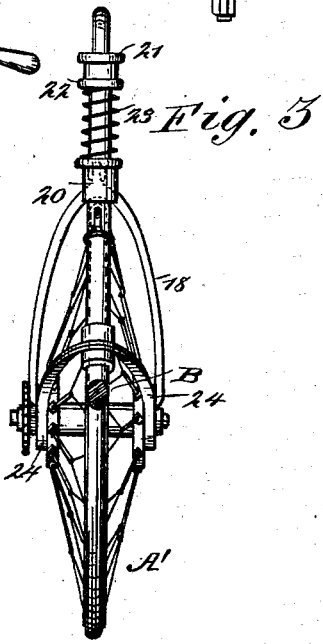

Figure 1 is a side elevation of a bicycle having the improvements applied thereto. Fig. 2 is a plan view of the bicycle as shown in Fig. 1; and Fig. 3 is a vertical section taken practically on the line 3—3 of Fig. 1.

Referring to the drawings A represents the forward wheel, A' the rear or driving wheel, and B the frame.

The frame B, may be of any suitable or desired construction, and a fork 18, is passed over the rear or driving wheel, A' and in this fork the axle or trunnions of the said wheel have bearing, the said axle or trunnions passing through suitable bearings in the lower ends of the fork. The fork at its upper end is pivotally connected by a centrally located bar 19 with a sleeve 20, the said sleeve having a sliding movement upon that portion of the frame adapted for use as or located adjacent to the saddle post. At or near the upper extremity of this portion of the frame a clip 21, is firmly secured; and beneath the clip an adjusting nut 22, is located, while a spring 23, is coiled around the frame having bearing against the sleeve 20 and the adjusting nut 22. Thus by manipulating the adjusting nut 22 more or less spring tension may be brought to bear upon the yoke 18.

In addition to the yoke 18 two lift springs 24, are employed, and these lift springs are ordinarily secured to a collar 25, the said collar being fastened securely upon the frame; but the springs may be secured to the frame in any other suitable or approved manner. The springs are located one at each side of the driving wheel, and their inner ends are connected with the lower extremities of the yoke 18; thus the yoke serves to tie together the two springs 24 and cause them to operate in unison; and by reason of this united action of the springs and the yoke the wheel will be prevented from canting laterally and will be held in proper alignment with the frame. I desire it to be further understood that although the springs 24 are shown as leaf springs, single springs may be used if in practice it is found more desirable.

Having thus described my invention, I claim as new and desire to secure by Letters Patent—

1. In a bicycle or like machine, the combination, with the frame and the driving wheel thereof, of a yoke having a spring-controlled sliding connection with the frame and provided with bearings for the axle or trunnions of the wheel, and springs rigidly connected with the frame and extending across opposite sides of the wheel, the springs being connected with the extremities of the yoke, substantially as shown and described, whereby the wheel is held in alignment with the frame and the frame is cushioned, as and for the purpose specified.

2. In a bicycle or like machine, the combination with the frame thereof and the driving wheel, of a yoke in which the wheel is journaled, a sleeve having sliding movement upon the frame and connected with the yoke, an adjusting nut also located upon the frame, a spring bearing against the sleeve and adjusting nut whereby tension upon the yoke may be regulated, and springs connected with the journal sections of the yoke, the said springs extending beyond the periphery of the wheel, one at each side, the side springs being unitedly connected with the frame, whereby both springs are compelled to act in unison, as and for the purpose specified.

GEORGE F. CASE.

Witnesses:
 FRED L. DOWNS,
 EDWARD LAVIN.